United States Patent [19]

Wilson

[11] Patent Number: 4,556,522
[45] Date of Patent: Dec. 3, 1985

[54] SIEVE TYPE DISTILLATION TRAY WITH CURVED BAFFLES

[75] Inventor: Keith B. Wilson, Allentown, Pa.
[73] Assignee: Air Products and Chemicals, Inc., Allentown, Pa.
[21] Appl. No.: 608,586
[22] Filed: May 9, 1984
[51] Int. Cl.[4] ............................................. B01F 3/04
[52] U.S. Cl. ............................................. 261/114 R
[58] Field of Search ............................. 261/114 R

[56] References Cited

U.S. PATENT DOCUMENTS

| 1,811,247 | 6/1931 | Smith | 261/114 R |
| 2,202,071 | 5/1940 | Dongen et al. | 261/114 R |
| 2,339,561 | 1/1944 | Durrum | 261/114 R |
| 3,162,700 | 12/1964 | Irons | 261/114 R |
| 3,172,922 | 3/1965 | Kehse | 261/114 R |
| 3,445,094 | 5/1969 | Shobe | 261/114 R |
| 3,759,498 | 9/1973 | Matsch | 261/114 |
| 3,887,665 | 6/1975 | Mix et al. | 261/114 |
| 4,101,610 | 7/1978 | Kirkpatrick et al. | 261/110 |
| 4,105,723 | 8/1978 | Mix | 261/105 |
| 4,132,761 | 1/1979 | Mix | 423/242 |

FOREIGN PATENT DOCUMENTS

| 765623 | 1/1957 | United Kingdom . | |
| 463455 | 4/1975 | U.S.S.R. | 261/114 R |

Primary Examiner—Tim Miles
Attorney, Agent, or Firm—Russell L. Brewer; E. Eugene Innis; James C. Simmons

[57] ABSTRACT

This invention pertains to a liquid-gas contacting tray or plate of the sieve type. A plurality of segment zones are established on the tray each having approximately the same area and flow path length. Vertically extending baffles are established within the segment zones to define smaller stages, the baffles being arcuate in shape and of constant radius. A plurality of perforations appear in the floor of the segment zones for vapor passage. By virtue of the establishment of small segment stages of similar length and width, the liquid flow paths, gradients, etc. remain equal and inefficiencies due to local variations in liquid to vapor ratio are minimized.

5 Claims, 2 Drawing Figures

6 PASS LAYOUT

SIEVE TYPE DISTILLATION TRAY WITH CURVED BAFFLES

TECHNICAL FIELD

This invention relates to distillation apparatus and in particular to a circular edge liquid-gas contacting tray of the sieve type.

BACKGROUND OF THE INVENTION

Distillation is a widely known process for effecting the separation of a fluid mixture. In the process, at least one component of the mixture is removed from the distillation column as an overhead vapor fraction. The less volatile component is removed from the column as a bottoms liquid fraction. The efficiency of a distillation column for separating a mixture into its components is directly related to the vapor velocity of the gas in contact with the liquid. If the vapor velocity is too high at some points in the column, there is a tendency to entrain liquid droplets and carry the liquid component upwardly. If the vapor velocity is low or non-existent, then there is insufficient contact to effect separation. Thus, it is desirable to maintain a uniform vapor velocity at all points on a tray. Not only is it desirable to achieve a uniform vapor velocity over the tray it is also desirable to maintain a uniform liquid/vapor ration (L/V) at all points on a tray. Variations in L/V, commonly known as maldistribution can be is caused by variations in vapor flow rate, liquid flow rate, or both. Vapor flow variations are most commonly caused by variations in the liquid level above the perforations, i.e., liquid head on the sieve tray. Variations in liquid level are caused by non-uniform liquid flow path lengths, liquid flow rates, unlevelness of the tray, etc. Variations in liquid flow rate are most commonly caused by non-uniform flow path lengths, and by non-uniformities in the distribution of liquid as it enters the distillation tray.

Another factor which influences the efficiency of the separation is related to the concentration gradient of the components in both the liquid and the vapor. The cross-flow tray, which is a standard in the industry, suffers from the problem that the concentration gradient shifts from one side of the column to the other as the direction of liquid flow changes on successive trays.

A technique developed to maintain a more uniform concentration gradient in a distillation column has been utilized and this technique includes a helical liquid flow path. In this technique the tray has been divided into a plurality of wedge shaped sections and liquid caused to flow across the wedge shaped sections in a generally arcuate flow path (helical within the column). The liquid is then removed and introduced to the tray below with the flow pattern being approximately 40 to 170° offset from the inlet to the tray above. The angle of offset varies approximately inversely with the number of segment zones. Although this type of tray maintains direction of liquid flow throughout the column, the trays suffer from maldistribution due to the common factors of variable flow path lengths, liquid recirculation, liquid gradient and so forth.

Representative patents which illustrates various trays for effecting liquid-gas contact in systems and designed to alter the flowpath of vapor or liquid on the tray as well as reduce the possibility of maldistribution caused by variable liquid levels above the perforations are as follows:

U.S. Pat. No. 3,759,498 discloses a slotted sieve tray having variable slot density. The trays incorporate a plurality of band members which are transverse to the liquid path and are designed to minimize the liquid gradient over the tray. The slot density within the band areas in the tray is varied to provide for a constant L/V over the entire tray.

U.S. Pat. Nos. 3,887,665; 4,105,723 and 4,132,761 discloses vapor liquid contacting devices having a damping means adjacent the surface of the tray to limit fluid oscillation and reduce vapor velocity through tray openings. One technique for damping fluid oscillation has been to include a layer of mesh comprising an interconnected cellular material. Typically knitted wire mesh, woven cloth and filamentary or fibrous felt for matting were used to accomplish this result. Parallel vertical sheets are located on a tray directly above the active area of the plate and used in conjunction with the knitted wire matrix to limit fluid oscillations.

U.S. Pat. No. 4,101,610 discloses a slotted sieve tray of the double pass type. A froth initiator is located at the inlet so as to reduce the kinetic energy of the liquid and thereby its hydrostatic head to allow full use of the contacting surface. Band portions adjacent to the liquid inlet and extending downstream for a distance of at least 20% of the transverse length of the liquid inlet and having angular orientation of slot openings away from the tray diametrical streamline are used.

British Pat. No. 765,623 discloses a tray for contacting a liquid with a gas having a corrugated surface and a liquid pathway generally transverse to the corrugations. A plurality of perforations are distributed in the corrugations with the vertical distance to the level of the liquid being non-uniform. In other words, some of the perforations are located near the upper portion of the corrugations while some are located in the valleys.

SUMMARY OF THE INVENTION

This invention pertains to a device for effecting contact between gas and liquid and in particular to a tray designed for effecting such contact in a fractionation process such as distillation or absorption. More particularly a circular edged liquid-gas contacting tray of the sieve type is divided into a plurality of segment zones which are isolated from liquid contact with each other. These segment zones have substantially parallel end portions. A plurality of vertically extending baffles are established within each of the segment zones and define a circular liquid pathway of substantially constant radius of curvature between the ends of the segment zones. Through the use of the curved vertically extending baffles a plurality of smaller stages are established within each segment zone. These stages provide for the handling and direction of equal liquid rates across the segment zone. Perforations are established in the floor of the tray substantially uniformly in the segment zones so that essentially uniform liquid to vapor ratios (L/V) are maintained at all points on the tray.

Some of the advantages associated with a tray of this design include:

liquid flow patterns which are essentially in the same direction at all stages in the column, so that the maximum driving force for mass transfer is available for each tray.

little, if any, recirculation of liquid due to the establishment of the smaller segment stages; reduced radial movement of liquid across the tray; and simple manufacturing techniques for tray constructions.

THE DRAWINGS

DETAILED DESCRIPTION OF THE INVENTION

Figure 1:
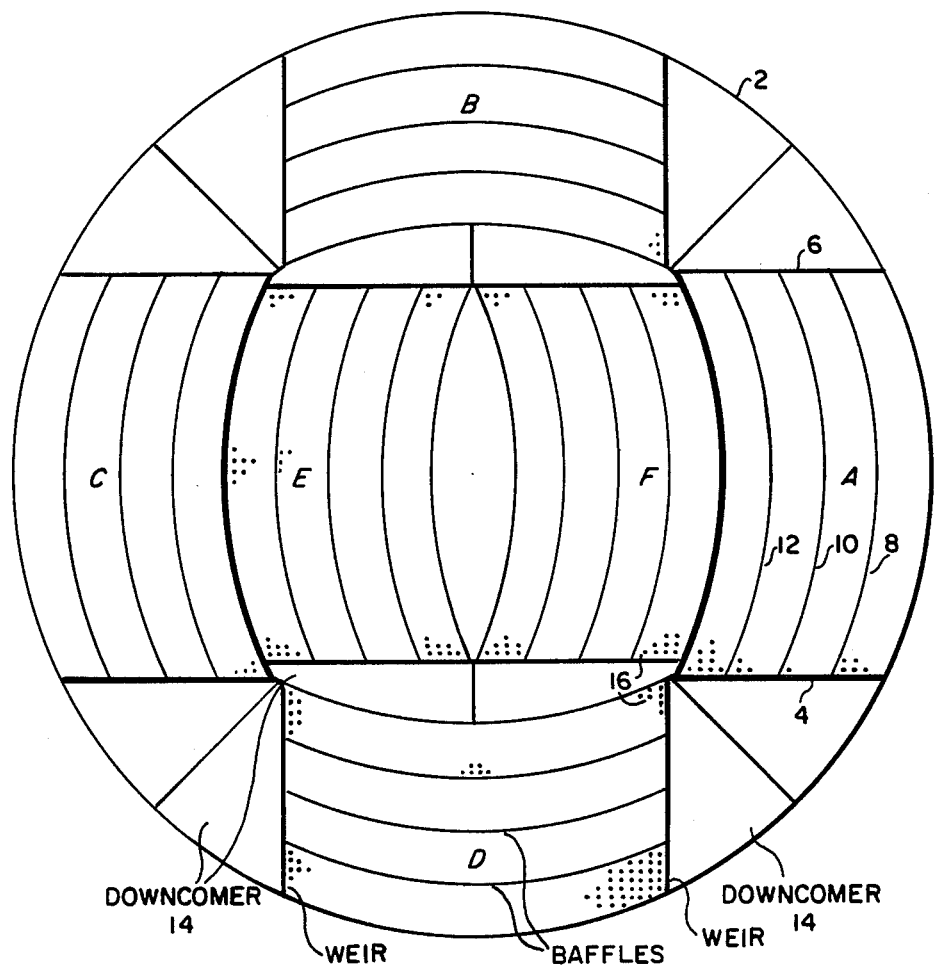
FIG. 1 is a top view of a circular edged liquid-gas contacting tray having six segment zones.

To facilitate an understanding of the invention reference is made to FIG. 1.

A circular edged liquid-gas contacting tray 2 for rectification, absorption and the like of the sieve type is divided into four segment zones described as A, B, C and D which are of substantially the same cross sectional area. Two other segment zones E and F are located inwardly and have a slightly smaller cross sectional area than zones A–D. (For simplicity segment zones A, B, C and D will be described with reference to zone A).

Each segment zone is provided with parallel end weirs 4 and 6 which extend vertically upward from tray 2. These weirs, 4 and 6, are in sealing arrangement with the tray and permit the introduction of a uniform flow of liquid across the ends of the segment zone. In contrast to the prior art, end weirs 4 and 6 are arranged substantially parallel to each other. In this way a flow path of constant length is achieved across the segment zone on the tray.

Each segment zone is further divided into a plurality of smaller stages through the utilization of vertically extending baffles 8, 10 and 12. The baffles 8, 10 and 12 are arcuate in shape and have a substantially constant radius, which is approximately equal to the tray radius. They are used to define a liquid flowpath between end weirs 4 and 6. Further, the vertically extending baffles are spaced apart from each other at uniform distances so that the smaller segment stages within the segment zone have substantially the same size and shape. In this way an equal volume of liquid is handled by each segment stage.

Typically the distance between the vertically extending baffles 8, 10 and 12 is approximately the height of the liquid above the tray including the froth. In addition, the height of the vertically extending baffles is selected so that it is also at least equal to the height of the liquid including froth on the tray. For cryogenic distillation, the height of the baffle is typically from 3–10 inches and the distance between baffles is 3–10 inches. For non-cryogenic systems, baffle heights and spacing may be as much as 18–24 inches. The vertically extending baffles 8, 10 and 12 prevent radial movement of liquid from one segment stage to another within the segment zone and thereby reduce the possibility of liquid head differential in a radial direction within the segment zone.

Figure 2:
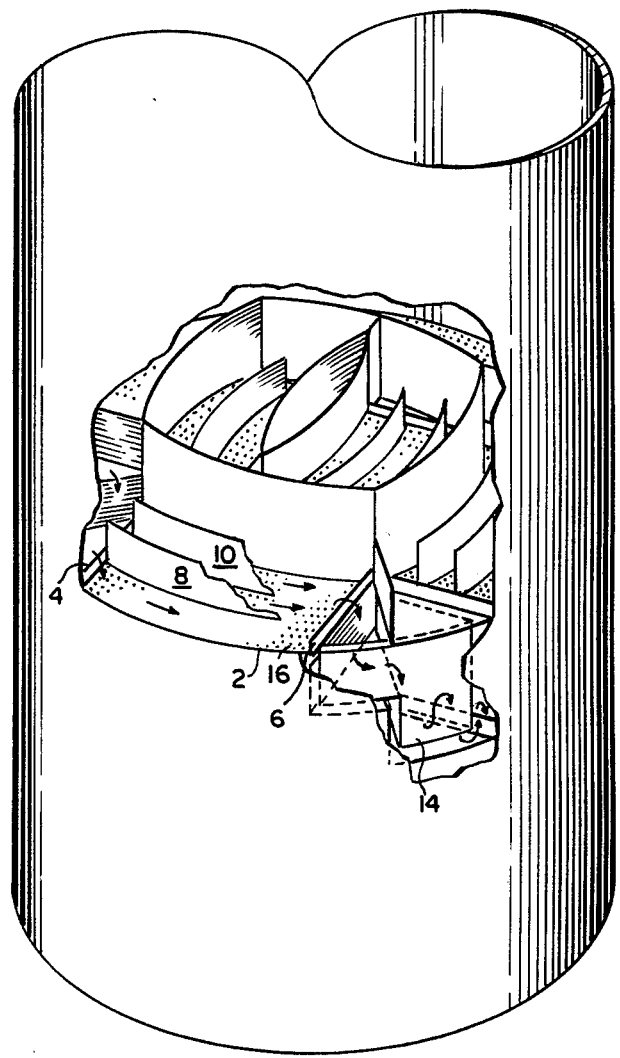
FIG. 2 is an isometric cutaway view of the tray and distillation column which shows the downcomers and their connection to the trays. Its purpose is to illustrate liquid flow path within the columns.

FIG. 2 is an isometric view in elevation of the column and tray and is provided to permit an understanding of the flow of liquid to and across the tray and the flow of vapor rising from the tray below and upwardly through the tray.

As is conventional in distillation columns, liquid to a tray is received from a downcomer and allowed to flow over a weir at the inlet of the active area of a segment zone. Liquid leaving the segment zone then flows over an outlet weir to a downcomer and is then introduced to the tray below. In the present system the liquid is received from downcomer 14 and allowed to flow over inlet end weir 4. Liquid then flows across segment zone A via discrete segment stages defined by the baffles 8, 10 and 12 and then over the outlet weir 6 and into downcomer 14 for introduction to another segment zone established on the tray below. Vapor from the tray below rises upwardly through segment zone A through perforations 16. These perforations are located substantially uniformly in each stage and with respect to each segment zone. This achieves an essentially uniform value of L/V at all points on the tray. To assure a uniform distribution of liquid flows, it may be advantageous to use orifices to place of an inlet weir, in order to establish liquid distribution between the smaller segment stages across the segment zone.

The distillation column operates so that the liquid flow path down the column is essentially helical. For example, as liquid enters into segment zone A it is caused to flow in the direction of the arrow. Vapor rises through perforations 16 within the segment stage and causes the liquid to bubble, thereby creating a froth. The liquid then flows from each segment stage over outlet weir 6 to downcomer 14. Downcomer 14 is designed and oriented so that it can effect rotation of the liquid through an angle of approximately 90°, for flowing across a segment zone on the tray below so as to simulate the same process that was achieved in segment zone A.

The utilization of curved baffles 8, 10 and 12 provides a narrow channel through which the liquid can flow across the segment zone and essentially eliminates recirculation of any liquid on the tray. In other words, a condition of plug flow is maintained within each smaller segment zone and a constant L/V is maintained within each stage.

Segment zones E and F are provided inwardly of zones A, B, C and D and used to maximize space utilization within the columns. Although they are slightly smaller in size than zones A, B, C and D, they are similarly constructed and therefore function in essentially the same way. In other words, they have parallel end weirs with vertically extending baffles defining smaller segment stages of similar length and cross-sectional area; they have a plurality of uniformly distributed perforations in the floor of the stages, etc.

Other variations in the design of the tray can be made without departing from the scope of the invention, for example, the segment zones may be offset at an angle other than 90°, e.g. 30°–130° depending upon the number of segment zones described.

What is claimed is:

1. In a fractionation column comprising circular edged liquid-gas containing trays of the sieve type which are suited for effecting intimate contact between rising vapor and liquid flowing across the trays from an inlet to an outlet and the liquid flowing downwards in a generally helical pathway in said column, the improvement which comprises a plurality of segment zones on said trays, each segment zone substantially isolated from liquid contact with the other, the segment zones having a liquid inlet end weir and a liquid outlet end weir which are substantially parallel to each other;

a plurality of baffles within each of said segment zones, said baffles extending vertically from the floor of said trays and defining a generally arcuate liquid pathway from one end weir portion to another, said baffles being spaced apart from each other at substantially equal distances thereby defining a multiplicity of liquid flow paths within smaller segment stages with substantially the same cross sectional area between the end weir portions of each segment zone; and a plurality of perforations in the floor of the trays uniformly distributed within each segment zone to permit passage of vapor through the trays for contact with the liquid.

2. The column of claim 1 wherein the baffles which extend vertically from the floor of the trays are at a height of from 3–10 inches and spaced apart from each other at a distance of from 3–10 inches.

3. The column of claim 2 wherein at least four segment zones are established within the trays.

4. The column of claim 3 wherein four segment zones are located near the perimeter of said circular trays and an additional two interior segment zones are established.

5. The column of claim 2 wherein orifices are provided at the liquid inlet of each segment zone to regulate liquid flow into each segment zone.

* * * * *